United States Patent [19]

Komanduri

[11] Patent Number: 4,690,691
[45] Date of Patent: Sep. 1, 1987

[54] POLYCRYSTALLINE DIAMOND AND CBN CUTTING TOOLS

[75] Inventor: Ranga Komanduri, Schenectady, N.Y.

[73] Assignee: General Electric Company, Schenectady, N.Y.

[21] Appl. No.: 830,414

[22] Filed: Feb. 18, 1986

[51] Int. Cl.⁴ .............................................. B24D 3/00
[52] U.S. Cl. ...................................... 51/293; 51/295; 51/309
[58] Field of Search .......................... 51/293, 295, 309

[56] References Cited

U.S. PATENT DOCUMENTS

| | | | |
|---|---|---|---|
| 3,743,489 | 7/1973 | Wentroy, Jr. et al. | 51/307 |
| 3,745,623 | 7/1973 | Wentroy, Jr. et al. | 29/95 |
| 4,255,165 | 3/1981 | Dennis et al. | 51/309 |
| 4,457,765 | 7/1984 | Wilson | 51/293 |
| 4,522,633 | 6/1985 | Dyer | 51/309 |
| 4,527,998 | 7/1985 | Knemeyer | 51/293 |
| 4,561,810 | 12/1985 | Ohno | 51/309 |
| 4,592,433 | 1/1986 | Dennis | 175/329 |
| 4,604,106 | 8/1986 | Hall et al. | 51/293 |

FOREIGN PATENT DOCUMENTS

| | | |
|---|---|---|
| 0003915 | 5/1979 | European Pat. Off. . |
| 0019461 | 11/1980 | European Pat. Off. . |
| 0104893 | 4/1984 | European Pat. Off. . |
| 0138392 | 4/1985 | European Pat. Off. . |
| 1489130 | 10/1977 | United Kingdom . |

*Primary Examiner*—Paul Lieberman
*Assistant Examiner*—Willie J. Thompson
*Attorney, Agent, or Firm*—Jane M. Binkowski; James C. Davis, Jr.; Paul R. Webb, II

[57] ABSTRACT

A cutting tool comprised of a polycrystalline layer of diamond or cubic boron nitride which has a cutting edge and at least one straight edge wherein one face of the polycrystalline layer is adhered to a substrate of cemented carbide and wherein a straight edge is adhered to one side of a wall of cemented carbide which is integral with the substrate, the thickness of the polycrystalline layer and the height of the wall being substantially equivalent.

26 Claims, 9 Drawing Figures

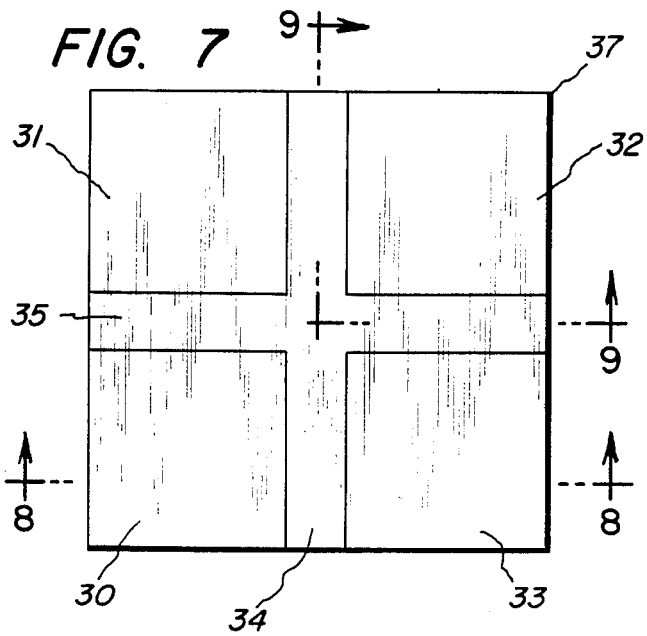
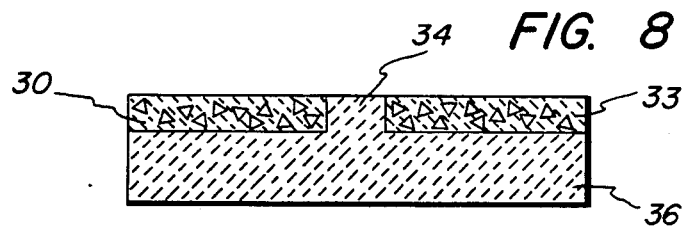
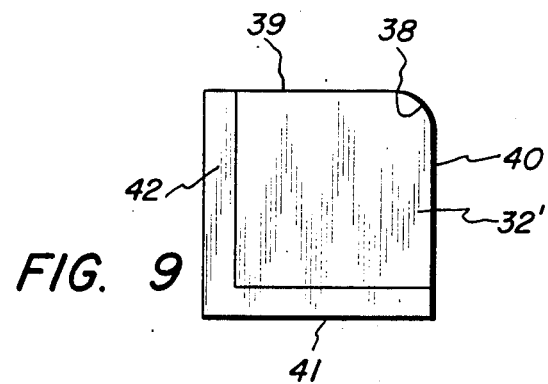

POLYCRYSTALLINE DIAMOND AND CBN CUTTING TOOLS

This invention relates to the production of polycrystalline diamond and cubic boron nitride (CBN) cutting tools.

Polycrystalline diamond and cubic boron nitride cutting tools have a thin diamond/CBN layer (about 0.030 inch) on top of a cemented tungsten carbide substrate. Because of the high temperature-high pressure process and high processing costs involved in the fabrication of ultrahard tool materials the costs of these tools is very high. With the introduction of new, less expensive ceramic tools, competition is becoming intense between the superhard tools and ceramics. One way to reduce the cost of the tools is to reduce the material costs by providing small size inserts. The final size can be obtained by pressing to near-net size or pressing a larger size insert and slicing it into small segments. This invention deals with the latter case.

Another way to reduce the costs is to reduce the fabricating costs. Slicing of larger size polycrystalline diamond/CBN inserts is done either by sawing, electrical discharge machining (EDM) or laser machining. One problem with any of these methods is that the removal rates are different for the diamond/CBN layer and the cemented carbide layer. The present invention overcomes this problem by providing cemented carbide partitions in the diamond/CBN layer. More specifically, the present invention provides a new support base shape or substructure. Instead of a flat top, the cemented carbide surface has partitions on the top surface. The number of partitions and the angle between the partitions depend on the size and shape of the tool. The height of the partition is the thickness of the diamond/CBN layer. Preferably, the carbide is initially pressed and sintered into this shape. Diamond/CBN powder is filled in the spaces between the partitions. The tool is then made using the conventional high temperature-high pressure process. It is then sliced through the cemented carbide partitions resulting in substantial saving of diamond and cubic boron nitride material. The final tool will have cemented tungsten carbide on the bottom and on one or more sides. The tool can be ground and mounted on a conventional tool holder. It is also possible to braze the polycrystalline diamond/CBN tools to the steel holder for additional support.

This invention will be better understood from the following description and drawings in which:

FIG. 7 is a top view of a composite of square shape wherein two crossed bars of cemented carbide divide the polycrystalline layer into four substantially equivalent parts;

FIG. 8 is a cross-sectional view of the composite of FIG. 7 taken on line 8—8; and FIG. 9 is a top view of a cutting tool formed by cutting the composite of FIG. 7 along line 9—9.

Figure 1:
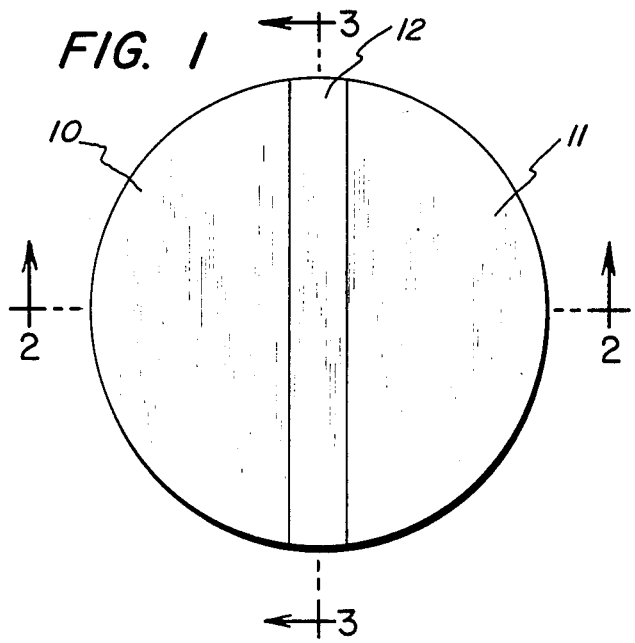
FIG. 1 is a top view of the present composite showing a partition of cemented carbide dividing the polycrystalline layer of diamond or cubic boron nitride into two substantially equivalent parts.

Briefly stated, the present process for producing a composite comprised of a partitioned polycrystalline diamond or cubic boron nitride layer adhered to a substrate structure wherein the layer is partitioned into at least two discrete areas by a substantially straight partitioning part of said substrate structure comprises forming a supporting structure comprised of a substrate with at least one substantially straight partition on its support surface dividing said support surface into at least two discrete support areas, said supporting structure being comprised of polycrystalline metal carbide containing a metallic cementing agent, substantially filling said support areas with a layer of crystals of diamond or cubic boron nitride, heating the resulting assembly under an applied pressure to a temperature above the melting point of said metallic cementing agent but below a temperature which has any significant deleterious effect on said assembly for a time sufficient to form said composite and recovering said composite.

The structure of the present composite allows it to be sliced apart through the cemented carbide partitioning part to form a plurality of cutting tools.

In the present process a supporting structure comprised of polycrystalline metal carbide containing a metallic cementing agent, i.e. a cemented carbide, is used. Cemented carbide bodies are commercially available and are well known in the art, and have been used as substrates for polycrystalline diamond/CBN cutting tools.

Generally, the cemented carbide body is produced by forming a compact of a sinterable carbide molding powder into a desired shape and size and sintering the compact. Usually, the sinterable powder is comprised of a mixture of a metal carbide powder and powdered metallic cementing agent, preferably selected from the group consisting of cobalt, nickel or iron. The carbide portion of the molding powder is preferably selected from the group consisting of tungsten carbide, titanium carbide, tantalum carbide, and mixture thereof (although other carbides may be added to obtain special properties). The compact is sintered in a protective atmosphere such as nitrogen or argon at a temperature which depends largely on its composition for a period of time sufficient to produce a cemented carbide of desired density. Suitable sintering temperatures generally range from about 1340° C. to about 1600° C. Generally, the composition of the compact as well as the resulting sintered body is comprised of from about 75 to 97% by weight carbide and about 3 to 25% by weight of the metallic cementing agent.

Preferably, the cemented carbide of the present invention has a porosity of less than about 15% by volume, more preferably less than about 10%, still more preferably less than about 5%, still more preferably less than about 1% by volume, and most preferably it has no significant porosity.

In carrying out the present process, a supporting structure is formed which is comprised of a substrate with at least one partition on its support surface. Generally, the substrate is a flat piece with its upper or top flat surface being the support surface. Such a flat support surface would be used for producing a cutting tool wherein the diamond or CBN layer is flat. If desired, however, the support surface can be curved for production of a cutting tool wherein the diamond or CBN layer is curved. The substrate can have any of a number of desired shapes such as, for example, that of a cylinder or a square.

The substrate should be at least sufficiently thick so that it can be held in a cutting tool holder. Generally, the thickness of the substrate is at least about 0.04 inch, and frequently it ranges from about 0.04 inch to about 0.25 inch.

The support surface of the substrate is provided with at least one substantially or completely straight partition which usually is in the form of a bar which divides the support surface into at least two discrete support areas, i.e. the partition forms with the support surface two discrete support areas. At this point in the process, the partition may or may not be integrally bonded to the substrate. If not bonded, integral bonding of the cemented carbide partition to the support surface of the substrate is effected during the present process. Preferably, the partition is integrally bonded by initially forming the unsintered compact into the form of the substrate with an integral partition or bar on its support surface and sintering such structure. It can also be preformed by EDM.

When one partition is used, it extends across the support surface of the substrate joining two opposed peripheral portions thereof to form two discrete support areas as, for example, illustrated in FIG. 1. Additional partitions may or may not extend totally across the support surface by they should be disposed so that all slicing of the resulting composite is through the cemented carbide partitions. Also, each discrete support area should be sufficiently large to enable the formation of a cutting tool from the resulting composite.

Since the supporting structure is comprised of cemented carbide, its dimensions are not significantly changed by the present process, i.e. its dimensions are the same or substantially the same as the substrate structure of the resulting composite. In the final product, i.e. composite, the thickness of the polycrystalline layer and the height of the cemented carbide partition are equivalent or substantially equivalent.

The support areas of the support structure are substantially or completely filled with a layer of crystals of diamond or cubic boron nitride. The thickness of the layer depends largely upon the desired thickness of the polycrystalline layer of the final product and is determinable empirically. The average size of the crystals can range widely and is determined empirically depending largely on the temperature and pressure conditions used as well as the type of polycrystalline layer desired in the cutting tool. Frequently, the crystals have an average size ranging from less than or about 1 micron to about 150 microns. The resulting assembly is then heated under applied pressure and temperature to produce the present composite.

Preferably, in carrying out the present process, the substrate structure is closely fitted into a cup or sleeve of a suitable shield metal and its discrete support areas are substantially or completely filled with diamond or CBN crystals to form the present assembly. A charge assembly is formed by capping the cup with a disc of shield metal or closing the ends of the sleeve with discs of shield metal. The enclosure of shield metal is normally used to prevent entry of oxygen in high temperature and pressure techniques used to form dense diamond or cubic boron nitride compacts as disclosed in U.S. Pat. Nos. 3,743,489 and 3,745,623, assigned to the assignee here of and incorporated herein by reference. Representative of a useful shield metal is zirconium, titanium, tantalum, tungsten and molybdenum.

The charge assembly is then placed in the reaction vessel of a high temperature, high pressure apparatus preferably of the type used for synthesizing diamonds or dense diamond compacts.

One preferred form of a high pressure, high temperature apparatus in which the instant invention may be practiced is the belt-type apparatus disclosed in U.S. Pat. No. 2,941,248—Hall (incorporated by reference) as well as in numerous other patents and publications. Those skilled in the art should, therefore, be well acquainted with this "belt-type" apparatus and, for this reason, no effort has been made to illustrate the apparatus in the drawings.

Essentially, the apparatus consists of a pair of cemented tungsten carbide punches disposed to either side of an intermediate belt or die member of the same material. The space between the two punches and the die is occupied by the reaction vessel and surrounding gasket-/insulation assemblies therefor. High pressures are generated in the reaction vessel from the compressive forces causes by the relative movement of the co-axially disposed punches toward each other within the die. Means are provided for heating the reaction vessel during the application of pressure.

Various reaction vessel configurations are shown in the patent literature (e.g. U.S. Pat. No. 3,423,177—Bovenkerk, incorporated by reference). U.S. Pat. Nos. 3,743,489 and 3,745,623 also disclose apparatus in which the present process can be carried out.

Operational techniques for simultaneously applying both high pressures and high temperatures in such apparatus are well known to those skilled in the superpressure art. There are, of course, various other apparatuses capable of providing the required pressures and temperatures that may be employed within the scope of this invention.

The assembly is heated under applied pressure to a temperature above the melting point of the cementing agent of the cemented carbide to a temperature which has no significant deleterious effect thereon for a period of time at least sufficient to produce the present composite. Generally, the temperature ranges from about 1300° C. to about 1600° C. and the time period is in excess of three minutes. The applied pressure depends largely on the particular temperature and crystals used.

Since the present bonding process is carried out at high pressures and temperatures, care must be taken not to graphitize the diamond starting material. A simple procedure employed to avoid this occurrence entails first establishing pressure conditions well within the diamond stable region on the phase diagram of carbon and thereafter raising the temperature. Specifically, when diamond is used, the minimum applied pressure should be sufficient to prevent graphitization of the diamond at the process temperature. For diamond, at 1300° C., the minimum applied pressure generally is about 50 kilobars whereas at 1400° C. the minimum pressure generally is about 52.5 kilobars.

Also, when cubic boron nitride crystals are used, sufficient pressure preferably is applied thereto before the system is heated to ensure thermodynamically stable conditions for cubic boron nitride. Specifically, when cubic boron nitride crystals are used, the minimum applied pressure should be sufficient to ensure thermodynamically stable conditions for cubic boron nitride at the process temperature. Specifically, for cubic boron nitride crystals, at 1300° C. the minimum applied pressure generally is about 40 kilobars and at 1600° C., the minimum applied pressure generally is about 50 kilobars.

In the present process, the sintering or cementing metallic agent of the cemented carbide melts and becomes fluid or semifluid and part of it is displaced from the support structure resulting in formation of the present composite wherein the crystals are bonded together in situ and to the substrate structure. The in situ bonding of the present composite allows the production of cutting tools therefrom without the use of brazing agents.

In one embodiment of the present process utilizing cubic boron nitride crystals, aluminum and an alloying metal of nickel, cobalt, manganese, iron, vanadium or chromium are deposited on the crystals to produce an aluminum alloy which alloys with the cementing agent during the process as disclosed in U.S. Pat. No. 3,743,489. The amount of aluminum ranges from about 1 to about 40% by weight of cubic boron nitride and the alloying metal ranges from about 2 to about 100% by weight of cubic boron nitride. Preformed aluminum alloys can be used. The aluminum alloy is particularly effective in the bonding together of cubic boron nitride crystals smaller than about 30 micrometers in largest dimension.

Upon completion of the high temperature, high pressure process, the temperature preferably is reduced first, and then the pressure to ensure the stability of the diamond or cubic boron nitride.

Upon recovery of the present composite, protective shield metal which remains affixed to the outer surfaces thereof can be ground away in a conventional manner.

The polycrystalline diamond or cubic boron nitride layer of the present composite is directly bonded to the substrate structure. The in situ bonding of the composite can vary depending largely on the particular processing conditions and the particular crystals used. For example, the polycrystalline layer may form an interface with the substrate structure and/or the interface may be at least partly, mostly or completely comprised of the cementing agent of the substrate structure. Also, the polycrystalline layer may or may not contain a metallic phase. The polycrystalline diamond or cubic boron nitride layer is sufficiently large, sufficiently thick and contains a sufficient concentration of diamond or cubic boron nitride to make it useful as a cutting tool. Generally, for a number of cutting applications, the diamond or cubic boron nitride layer has a thickness ranging from about 0.005 inch to about 0.125 inch. Preferably, the cutting area length of the layer is at least about 0.025 inch. Preferably, the volume fraction of diamond or cubic boron nitride is greater than 70% by volume of the layer. Frequently, the average crystal size of the polycrystalline layer ranges from about 1 $\mu$m to about 150 $\mu$m.

The present composite is comprised of a partitioned polycrystalline diamond or cubic boron nitride layer adhered to an integral substrate structure. The diamond or cubic boron nitride layer has one or more exposed edges, i.e. sides, and one or more straight or substantially straight adhered edges, i.e. adhered sides. The substrate structure is comprised of a substrate, wherein one face thereof is a support surface with one or more straight or substantially straight partitions integrally bonded to the support surface or surface portion. The partition divides the support surface into at least two discrete support areas. The support areas are filled or substantially filled with a diamond or cubic boron nitride layer. A face of the diamond or cubic boron nitride layer is adhered to the support surface and the adhered edge of the layer is adhered to a side of the partition. The thickness of the polycrystalline diamond or cubic boron nitride layer is equivalent or substantially equivalent to the height of the partition. The composite is sufficiently large to enable formation of at least two cutting tools therefrom. Preferably, the composite has a diameter of at least about 0.25 inch.

The composite is sliced apart through the cemented carbide partition or partitions to produce a plurality of finished or unfinished cutting tools. Such slicing can be carried out in a conventional manner by, for example, EDM or laser machining. If desired, before this slicing procedure, the exposed edge of the composite can be shaped by conventional means such as grinding or EDM to produce a desired cutting surface finish so that slicing of such composite results in direct production of a plurality of finished cutting tools. Alternatively, the composite can be initially sliced into a plurality of unfinished cutting tools and the exposed edges or edge thereof can be shaped in a conventional manner to produce the desired cutting surface finish.

The present cutting tool is comprised of a polycrystalline diamond or cubic boron nitride layer adhered to an integral substrate structure. The tool's substrate structure is comprised of a substrate having at least one straight or substantially straight edge from which a wall extends integrally. The polycrystalline layer has a cutting edge and one or more straight or substantially straight adhered edges, i.e. adhered sides. One face of the polycrystalline layer is adhered to a face of the substrate and is coextensive or substantially coextensive therewith. Each straight adhered edge of the layer is supported by being adhered to a side of a wall of the substrate structure. The thickness of the polycrystalline diamond or cubic boron nitride layer and the height of the wall are equivalent or substantially equivalent.

FIG. 1 shows one form of the present composite wherein cemented carbide partition 12 divides two polycrystalline diamond or cubic boron nitride layers 10 and 11.

Figure 2:
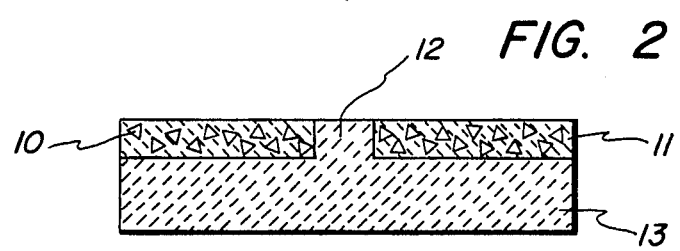
FIG. 2 is a cross section of the composite of FIG. 1 taken on line 2—2.

FIG. 2 shows the direct bonding of partition 12 to substrate 13 and the discreteness of layers 10 and 11.

Figure 3:
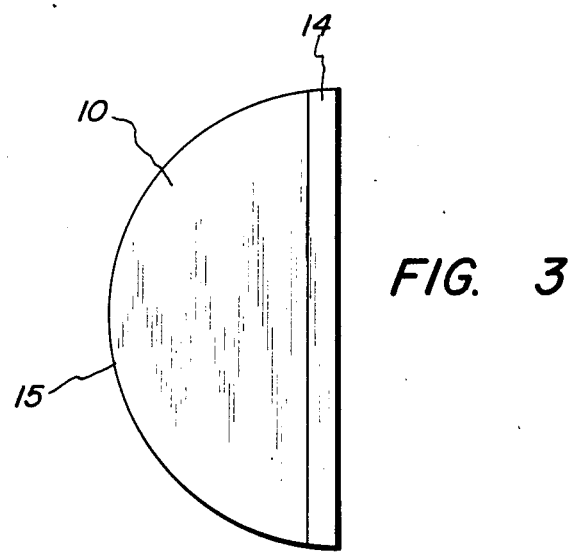
FIG. 3 is a top view of a cutting tool formed by cutting through the cemented carbide partition of FIG. 1 on line 3—3.

By slicing through the cemented carbide partition 12 of FIG. 1, the cutting tool of FIG. 3 can be produced wherein polycrystalline layer 10 with cutting edge 15 is adhered to supporting cemented carbide wall 14 and substrate (not shown).

Figure 4:
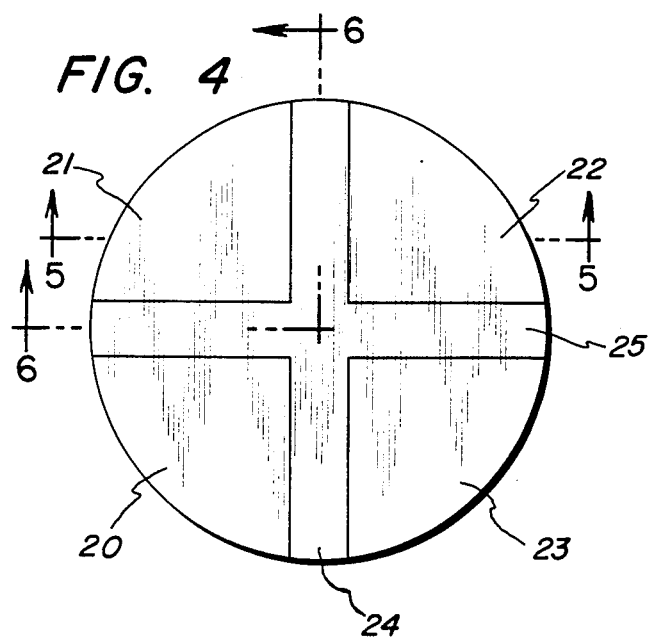
FIG. 4 is a top view of the present composite showing two crossed bars of cemented carbide dividing the polycrystalline layer into four substantially equivalent parts.

FIG. 4 shows another form of the present composite wherein cemented carbide partitions 24 and 25 divide four polycrystalline diamond or cubic boron nitride layers 20, 21, 22, and 23.

Figure 5:
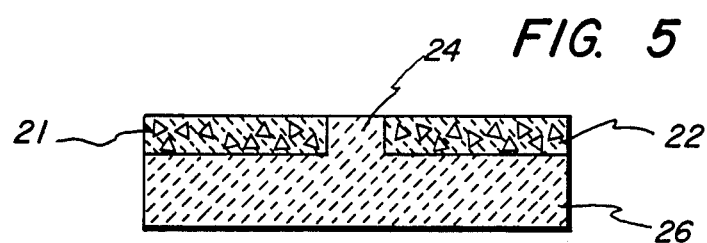
FIG. 5 is a cross-sectional view of the composite of FIG. 4 taken on the line 5—5.

FIG. 5 shows the integral bonding of partition 24 to substrate 26 and the discreteness of polycrystalline layers 21 and 22.

Figure 6:
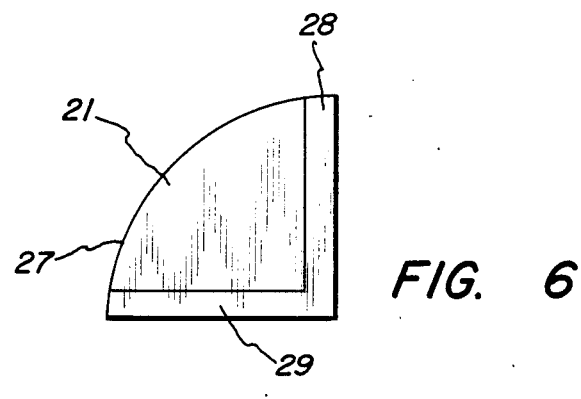
FIG. 6 is a top view of a cutting tool produced by cutting through the bars of FIG. 4 along line 6—6.

By slicing through the cemented carbide portions of FIG. 4, the cutting tool of FIG. 6 can be produced wherein polycrystalline layer 21 with cutting edge 27 is adhered to supporting cemented carbide walls 28 and 29 and substrate (not shown).

FIG. 7 differs from FIG. 4 in that the composite is square in form. Specifically, FIG. 7 shows cemented carbide partitions 34 and 35 dividing polycrystalline diamond or cubic boron nitride layers 30, 31, 32, and 33.

FIG. 8 shows the integral bonding of partition 34 to substrate 36 and the discreteness of polycrystalline layers 30 and 33.

By slicing through the cemented carbide partitions of FIG. 7 and rounding edge 37 by, for example, grinding it with a diamond wheel, the cutting tool of FIG. 9 can be produced. In FIG. 9 polycrystalline diamond or cubic boron nitride layer 32' having straight cutting edges 39 and 40 and nose radius 38 is adhered to supporting cemented carbide walls 41 and 42 and substrate (not shown).

It is to be understood that the cutting tools produced by the present invention will, most usually, be mounted or bonded to a larger body, e.g. a tool shank or a milling cutter or a drill bit, for presentation to the material to be cut. The present cutting tools are useful for grinding or cutting materials having a hardness between about 2 to 9 hardness on the Moh scale. For example, the present cutting tools are useful in turning, boring and milling operations on metals such as copper, brass, bronze, silver, gold, platinum and alloys of aluminum, magnesium, steels, superalloys, titanium and zinc. The present cutting tools are also useful in the machining of nonmetallic materials such as plastics, stone, concrete, composites and ceramics.

The invention is further illustrated by the following examples wherein the procedure was as follows unless otherwise stated:

The substrate and the partition or partitions, i.e. bars, were comprised of cemented carbide, i.e. polycrystalline tungsten carbide cemented with cobalt which was present in an amount of about 13% by weight of the cemented carbide body. Each cemented carbide body had a porosity of less than about 5% by volume.

The high pressure high temperature apparatus used was substantially of the same type disclosed in U.S. Pat. No. 3,745,623.

EXAMPLE 1

The composite illustrated in FIG. 4 was prepared in this example.

A cemented carbide disk about 0.125 inch thick and about 0.35 inch in diameter was subjected to EDM to remove material therefrom to form a crossed bar configuration as illustrated in FIG. 4 and four flat support surfaces. Each bar had a width of about 0.050 inch and a height of about 0.050 inch. The resulting integral substrate structure had four substantially equivalent discrete support areas.

The substrate structure was fitted into a molybdenum cup. Each support area of the substrate structure was filled with a layer of diamond crystals having an average size range of about 10–40 μm with some fines.

The cup was then capped with a disc of molybdenum and the resulting assembly was placed in the reaction vessel of the high pressure high temperature apparatus. The pressure was raised to 55 kilobars. The temperature was then raised to 1380° C. where it was held for about 10 minutes. Heat input was then ceased and after the system had cooled to close to ambient temperature, the pressure was removed. The resulting composite having molybdenum adhered to its outer surface was then recovered. The molybdenum deposit was removed from the composite by grinding.

All of the polycrystalline diamond layers of the composite were well adhered to the substrate structure. Each polycrystalline layer had a thickness of about 0.05 inch and a concentration of diamond crystals greater than about 70% by volume of the layer. The thickness of each polycrystalline layer and the height of the partition, i.e. bars, were substantially equivalent.

The exposed edge of the composite was ground by means of cylindrical precision grinding to give the required shape, size and finish. The composite was then sliced through the partition of cemented carbide by means of electrical discharge machining forming four finished cutting tools. One of the cutting tools is illustrated in FIG. 6 and if mounted in a tool holder, it could be used to cut materials such as the abrasive aluminum-silicon alloys.

EXAMPLE 2

In this example, the composite illustrated in FIG. 1 was produced.

The procedure used in this example was substantially the same as that disclosed in Example 1 except that one bar was formed in the disk to form the single bar configuration illustrated in FIG. 1. The resulting substrate structure had two substantially equivalent discrete support areas.

In the resulting composite, both polycrystalline diamond layers were well adhered to the substrate structure Each polycrystalline layer had a thickness of about 0.05 inch and a concentration of diamond crystals greater than about 70% by volume of the layer. The thickness of each polycrystalline layer and the height of the partition, i.e. bar, were substantially equivalent.

The exposed edge of the composite was ground by means of cylindrical precision grinding to give the required shape, size and finish. The composite was then sliced through the cemented carbide partition by means of electrical discharge machining to form two finished cutting tools. One of the cutting tools is illustrated in FIG. 3 and if mounted in a tool holder, it could be used to cut materials such as the abrasive aluminum-silicon alloys.

What is claimed is:

1. A process for producing a composite of a partitioned polycrystalline diamond layer adhered to a substrate structure wherein said layer is partitioned into at least two discrete areas by a substantially straight partitioning part of said substrate structure, which comprises forming a supporting structure comprised of a substrate with at least one substantially straight partition on its surface, said partition dividing said support surface forming therewith at least two discrete support areas, said supporting structure being comprised of polycrystalline metal carbide containing a metallic cementing agent, substantially filling said support areas with crystals of diamond, heating the resulting assembly under an applied pressure to a temperature above the melting point of said metallic cementing agent but below a temperature which has any significant deleterious effect on said assembly for a period of time sufficient to form said composite and recovering said composite.

2. The process of claim 1 wherein said partition is in the form of a bar extending across said support surface dividing said support surface forming therewith substantially equivalent support areas.

3. The process of claim 1 wherein said partition is in the form of two crossed bars extending across said support surface dividing said support surface forming therewith four substantially equivalent support areas.

4. The process of claim 1 wherein said partition has a width ranging from about 0.01 inch to about 0.25 inch.

5. The process of claim 1 wherein the carbide content of said cemented carbide is predominantly comprised of a material selected from the group consisting of tungsten carbide, titanium carbide, tantalum carbide and a mixture thereof.

6. The process of claim 1 wherein said substrate has a thickness ranging from about 0.04 inch to about 0.25 inch.

7. The process of claim 1 wherein said temperature ranges from about 1300° C. to about 1600° C.

8. The process of claim 1 wherein said polycrystalline diamond layer ranges in thickness from about 0.005 inch to about 0.125 inch.

9. The process of claim 1 wherein said composite is sliced through said partitioning part to form a plurality of cutting tools.

10. A process for producing a composite of a partitioned polycrystalline cubic boron nitride layer adhered to a substrate structure wherein said layer is partitioned into at least two discrete areas by a substantially straight partitioning part of said substrate structure, which comprises forming a supporting structure comprised of a substrate with at least one substantially straight partition on its support surface, said partition dividing said support surface forming therewith at least two discrete support areas, said supporting structure being comprised of polycrystalline metal carbide containing a metallic cementing agent, substantially filling said support areas with crystals of cubic boron nitride, heating the resulting assembly under an applied pressure to a temperature above the melting point of said metallic cementing agent but below a temperature which has any significant deleterious effect on said assembly for a period of time sufficient to form said composite and recovering said composite.

11. The process of claim 10 wherein said partition is in the form of a bar extending across said support surface dividing said support surface forming therewith substantially equivalent support areas.

12. The process of claim 10 wherein said partition is in the form of two crossed bars extending across said support surface dividing said support surface forming therewith four substantially equivalent support areas.

13. The process of claim 10 wherein said partition has a width ranging from about 0.01 inch to about 0.25 inch.

14. The process of claim 10 wherein the carbide content of said cemented carbide is predominantly comprised of a material selected from the group consisting of tungsten carbide, titanium carbide, tantalum carbide and a mixture thereof.

15. The process of claim 10 wherein said substrate has a thickness ranging from about 0.04 inch to about 0.25 inch.

16. The process of claim 10 wherein aluminum and an alloying metal selected from the group consisting of nickel, cobalt, manganese, iron, vanadium and chromium are deposited on said crystals of cubic boron nitride, said aluminum ranging from about 1% by weight to about 40% by weight of the weight of said crystals of cubic boron nitride and said alloying metal ranging from about 2% by weight to about 100% by weight of the weight of said crystals of cubic boron nitride.

17. The process of claim 10 wherein said temperature ranges from about 1300° C. to about 1600° C.

18. The process of claim 10 wherein said polycrystalline cubic boron nitride layer ranges in thickness from about 0.005 inch to about 0.125 inch.

19. The process of claim 10 wherein said composite is sliced through said partitioning part to form a plurality of cutting tools.

20. A composite comprised of at least two separated polycrystalline diamond or cubic boron nitride layers directly adhered to an integral substrate structure, each said diamond or cubic boron nitride layer having an exposed edge and a substantially straight adhered edge, said substrate structure being comprised of a substrate having a flat support surface and at least one substantially straight partition integrally bonded to said support surface, said partition dividing said support surface forming therewith at least two discrete support areas, each said support area being substantially filled with one of said diamond or cubic boron nitride layers, a face of each said diamond or cubic boron nitride layer being adhered to the flat support surface of said area and the adhered edge of each said diamond or cubic boron nitride layer being adhered to a side of said partition, the thickness of said polycrystalline diamond or cubic boron nitride layer being substantially equivalent to the height of said partition, said substrate structure being comprised of polycrystalline metal carbide containing a metallic cementing agent.

21. The composite according to claim 20 wherein said metal carbide is predominantly comprised of a material selected from the group consisting of tungsten carbide, titanium carbide, tantalum carbide and a mixture thereof.

22. The composite according to claim 20 wherein said support areas are substantially equivalent in size.

23. The composite according to claim 20 wherein said exposed edge of said diamond or cubic boron nitride layer is round.

24. The composite according to claim 20 wherein each said exposed edge of said diamond or cubic boron nitride layer is comprised of two straight adjoining edges and wherein each said layer has two straight adjoining adhered adges.

25. The composite according to claim 20 wherein said partition is in the form of a bar.

26. The composite according to claim 20 wherein said composite is curved.

* * * * *